United States Patent [19]
Shaffer, Jr.

[11] 3,874,088
[45] Apr. 1, 1975

[54] OPTICAL PLUMBING APPARATUS
[76] Inventor: William Shaffer, Jr., 3103 Carter, Pasadena, Tex. 77503
[22] Filed: Feb. 7, 1973
[21] Appl. No.: 330,295

[52] U.S. Cl.................................. 33/286, 33/227
[51] Int. Cl........................................... G01c 15/00
[58] Field of Search ............ 33/227, 263, 286, 275, 33/292, 299

[56] References Cited
UNITED STATES PATENTS
2,570,458 10/1951 Kowalczyk........................ 33/275 R
3,324,557 6/1967 Hodges.............................. 33/227

FOREIGN PATENTS OR APPLICATIONS
209,984 5/1940 Switzerland.......................... 33/292
260,205 5/1970 U.S.S.R................................. 33/286

*Primary Examiner*—Harry N. Haroian
*Assistant Examiner*—Richard R. Stearns

[57] ABSTRACT

A telescope is mounted for 360° rotation within a tubular collar. The collar is supported in a vertical position by means of a collar flange supported by an apertured frame. The apertured frame is supported over an apertured base to allow the tubular collar to extend therethrough. The base is fixed to the framework of a vertical wall. Bevel screws on the frame vertically orient the telescope by reference to level vials attached to the telescope. By sighting the telescope on a fixed target, the relationship between the telescope axis and a known point can be determined with respect to the target or a known reference point.

4 Claims, 2 Drawing Figures

PATENTED APR 1 1975 3,874,088

OPTICAL PLUMBING APPARATUS

BACKGROUND OF THE INVENTION

This invention relates to an optical plumbing apparatus for locating a point in vertical alignment above a fixed reference point or target. More precisely, this invention relates to an optical plumbing apparatus for checking the vertical plumb of buildings, elevator shafts and the like during construction.

The prior art discloses a number of plumb-bob type instruments that are used for orienting a transit or other surveying device over a physical point on the ground. These plumb-bob type devices are useful in place of a conventional plumb-bob in that they are not effected by wind or the weather. Such plumb-bob type devices are disclosed in the following U.S. Pat. Nos. 515,815, Brightly et al; 928,477, Sloggett; 2,679,181 Keffuel et al.

In U.S. Pat. No. 1,903,333 to C. Botel, issued Apr. 4, 1933, a plumbing and leveling instrument for use in checking the vertical plumb of buildings under construction is disclosed. However, the Botel device is cumbersome and does not have accurate means for determining whether the telescope is vertically oriented. In addition, the telescope cannot be rotated to determine accurate vertical alignment of the telescope throughout its range.

In U.S. Pat. No. 3,324,557 to W. S. Hodges, issued June 13, 1967, an optical plumbing device is disclosed. However, the device is complicated and does not provide a precise means for vertically orienting the plumbing telescope. In certain applications, a plumb-bob or other sighting device must be utilized to initially orient the device.

Accordingly, one primary feature of the present invention is to provide a simple optical plumbing apparatus that requires a minimum of equipment and adjustment.

Another feature of the present invention is to provide an optical plumbing apparatus in which the telescope is mounted for 360° rotation and its vertical alignment may be checked throughout the 360° traverse in order to precisely align the telescope in a vertical position.

Yet another feature of the present invention is that the optical plumbing apparatus may be utilized to sight downwardly upon a reference point or to sight upwardly upon a reference point merely by reversing the telescope.

Still another feature of the present invention is to provide an optical plumbing instrument that can be readily attached to steel columns or other portions of a steel structure and then adjusted to a position by which it can be determined whether or not the columns or masonry work built about the columns is along vertical lines.

SUMMARY OF THE INVENTION

The present invention remedies the problems of the prior art by providing an optical plumbing instrument that may readily be attached to the steel framework of a building under construction for checking the vertical plumb of the vertical walls of the building.

A conventional telescope is provided that may be mounted upon a supporting frame by means of a tubular collar and extending flange. The telescope is mounted concentrically within the tubular collar and is free to rotate 360°. Attached to the telescope are leveling vials that can be rotated with the telescope through its 360° traverse for checking vertical alignment of the telescope in varying positions. The supporting frame is adjustable with relation to a planar base so as to adjust the attitude of the support frame with regard to the base and thereby vertically orient the telescope supported by the support frame. The support frame may be moved laterally through short distances in order to precisely orient the telescope reticle over a known reference target.

In accordance with a principle of this invention an optical plumbing apparatus is provided for locating a point in vertical alignment above a fixed reference point, comprising a planar base with an opening therethrough, a supporting base having an opening therethrough for indexing over said opening in said base, a tubular collar having an extending flange, said collar insertable through said openings in said frame and base, said collar supportable on said frame by means of said flange, a telescope carried by said tubular collar and adopted for 360° rotation therein, said telescope carrying a plurality of level vials, and means for leveling said level vials carried by said telescope and orienting said telescope in a vertical position, said supporting frame adjustable in relation to said base for exactly aligning said telescope with the fixed reference point.

BRIEF DESCRIPTION OF THE DRAWINGS

In order that the manner in which the above-recited advantages and features of the invention are attained can be understood in detail, a more particular description of the invention may be had by reference to specific embodiments thereof which are illustrated in the appended drawings, which drawings form a part of this specification. It is to be noted, however, that the appended drawings illustrate typical embodiments of the invention and therefore are not to be considered limiting of its scope for the invention may admit to further equally effective embodiments.

In the Drawings.

DETAILED DESCRIPTION OF THE PREFERRED EMBODIMENTS

Figures 1, 2:
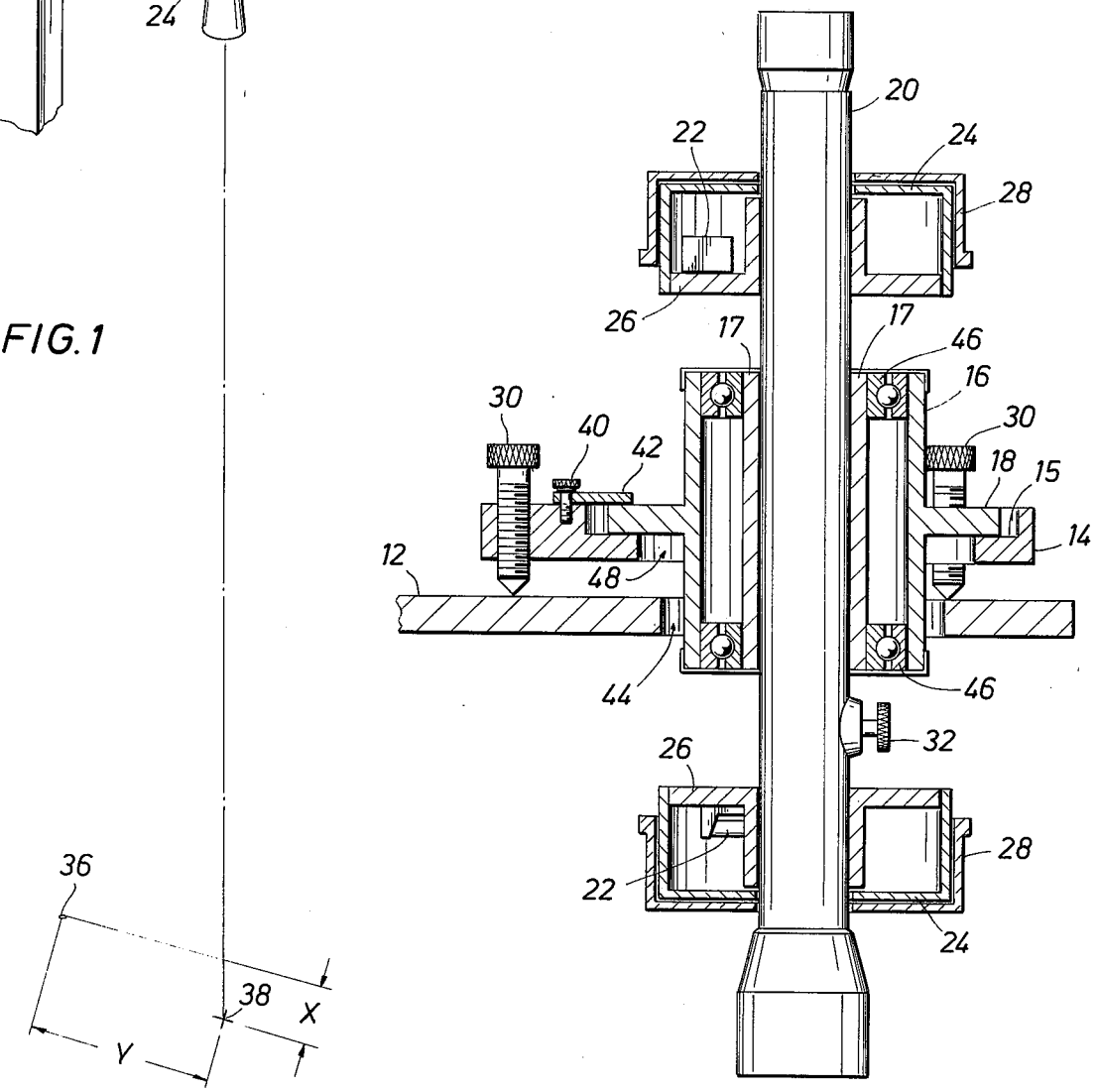
FIG. 1 is a perspective view (partly in cross section) of an optical plumbing apparatus according to the present invention.
FIG. 2 is a vertical cross-sectional view of the optical plumbing apparatus.

Referring now to FIGS. 1 and 2, an optical plumbing apparatus 10 according to the present invention is shown. The optical plumbing apparatus 10 is shown attached to steel framing 34 of a building under construction. The optical plumbing apparatus 10 comprises a planar base 12 that is conventionally attached to steel framing 34 or other parts of the frame or structure of the building, elevator shaft or the like. The base is conventionally attached by means not shown in the drawings, which may be C-clamps or other conventional retaining devices. Base 12 has a central aperture 44 therethrough for accommodating the tubular collar 16 carrying telescope 20 of the plumbing apparatus. Tubular collar 16 extends through aperture 44 of base 12 and the collar is supported by means of a flange 18 by supporting frame 14. Support frame 14 has a central aperture 48 therethrough for accommodating collar 16 and an extending shoulder or surface 15 for engaging and supporting flange 18. Clamps 42 may be provided for holding and clamping flange 18 in place. The clamps may be retained by conventional screws 40.

Support frame 14 is supported above base 12 by means of a plurality of frame leveling screws 30. A typical arrangement utilizes three leveling screws 30 that support the frame 14 above base 12. By means of screws 30 the relative attitude of the support frame 14 may be adjusted with respect to base 12 as will be hereinafter further described.

The telescope is mounted for 360° rotation within collar 16 by means of a pair of ball bearing races 46 that are clamped between the support collar 16 and an inner collar 17 that is attached to the barrel of telescope 20.

At each end of the barrel of telescope 20 is attached a level vial housing 24 that has a base 26 to support a pair of level vials 22. The housing is shown partially open in FIG. 1 and may be closed by means of a sliding or rotating cover 28. As will be noted, the level vial housings 24 are mounted in opposite relation to each other on opposite ends of the telescope 20 so that level indication means may be provided depending on whether telescope is oriented to be sighted in an upward or a downward vertical position.

The telescope 20 is any conventional telescope having a cross hair reticle and a focusing means such as focusing knob 32 and is advantageously a Kueffel & Esser Company dumpy level.

In operation, the base 12 is clamped to steel cross member 34 by conventional clamping means (not shown). The support frame 14 is centered so that its central aperture 48 is concentrically aligned with the aperture 44 in base 12. The telescope is lowered through apertures 48 and 44 so that tubular collar 16 extends through apertures 48 and 44 and the collar flange 18 engages surface 15 of the supporting frame 14. With the flange 18 supported by frame 14, the flange 18 may be clamped in position by means of clamp springs 42. Cover 28 is rotated so that the upper level vial housing 24 is opened and the level vials 22 are exposed. Then level vials 22 are leveled by means of adjustment of the support frame leveling screws 30 in a conventional manner. The telescope 20 may be rotated 360° so that level vials 22 may be rotated for leveling by means of various ones of the support frames leveling screws 30. When level vials 22 indicate a level condition when rotated through 360°, then the telescope is correctly oriented in a vertical position.

Sighting through the telescope 20, the reticle of the telescope can be oriented to coincide with target 38 which may be on the ground level or at some level below the level at which the plumbing instrument is mounted. Horizontal adjustment of the cross hairs or reticle may be accomplished by horizontal movement of frame 14 in relation to base 12 within aperture 44.

Once the telescope is vertically oriented and its reticle is aligned with target 38, the position of reference point 36' may be determined precisely with relationship to reference point 36. As will be noted, the relationship of reference point 36' to the reticle or central axis of telescope 20 is measured by means of X' and Y', which can be compared to the relationship of the target 38 to reference point 36 measured by X and Y. In this way, the plumb of a building or other structure may be checked precisely with relationship to a known reference point while it is under construction and appropriate corrections and changes can be made if the building structure is not within sufficient construction tolerances.

The optical plumbing apparatus is self-verifying in that once the level vials 22 are leveled by means of adjustment of the support frame leveling screws 30, the accuracy of the vertical positioning of the telescope 20 may be checked or verified by rotating the telescope 20 by 180°. If properly leveled, the cross-hair reticle of the telescope should still be on the target 38. However, if it moves off from the target 38 by a fraction of an inch, the difference can be split for measurement purposes without releveling the telescope level vials 22. Often it occurs that the instrument may be properly leveled and oriented vertically, but heat expansion due to sunlight can cause the reticle to move in relation to the target. The rotational ability of this instrument causes it to self verify its accuracy by merely rotating telescope 20 by 180°.

As may be noted, the optical plumbing apparatus disclosed herein would be ideally suited for constructing and checking the plumb of elevator shafts under construction in a building. The base 12 could be modified to be clamped to the elevator shaft housing so as to check the plumb of the elevator shaft under construction. Of course, many other applications in which a true vertical plumb is necessary during construction or erection of buildings or structures may be visualized in which the disclosed optical plumbing apparatus would be useful.

Numerous variations and modifications may obviously be made in the structure herein described without departing from the present invention. Accordingly, it should be clearly understood that the forms of the present invention herein described and shown in the figures of the accompanying drawings are illustrative only and not intended to limit the scope of the invention.

What is claimed is:

1. An optical plumbing apparatus for locating a point in vertical alignment above a fixed reference point, comprising a planar base with an opening therethrough, a supporting frame having an opening formed therein and being positionable over said opening in said base, a tubular collar having a centrally located flange extending in substantially normal relation to said collar, said collar being insertable through said openings in said frame and base, said collar being adjustably supportable on said frame by means of said flange, engaging a portion of said frame a telescope carried by said tubular collar and being supported for 360° rotation therein, said telescope carrying a level vial at each extremity thereof, a plurality of adjustable leveling elements being carried by said supporting frame and reacting against said base, said leveling elements being manipulatable for orienting said telescope in a vertical position, and said leveling elements being slidably movable on said base for precisely aligning said telescope with the fixed reference point.

2. An optical plumbing apparatus for locating a point in vertical alignment above a fixed reference point, comprising a base with an opening therethrough, a supporting frame having an opening formed therein, said opening of said supporting frame being positionable over said opening in said base, a tubular collar having an annular flange disposed thereabout, said flange being disposed intermediate the extremities thereof and extending in substantially normal relation to said collar, said flange engaging and being adjustably supported by said frame whereby at least a portion of said collar extends through said openings, an inner collar being disposed within said tubular collar, a telescope being supported within said inner collar, bearing means disposed between said tubular collar and said inner collar and mounting said inner collar for 360° rotation relative to said tubular collar, a pair of leveling vials being supported by said telescope, one of said leveling vials being disposed at each extremity of said telescope, a plurality of leveling elements being carried by said supporting frame and engaging said base, said leveling elements being manipulatable for orienting said telescope in a precisely vertical position, and said leveling elements being slidably movable on said base for exactly aligning said telescope with the fixed reference point.

3. An optical plumbing apparatus for locating a point in vertical alignment above a fixed reference point, comprising a planar base having an opening therethrough, a supporting frame having an opening formed therein, said opening of said supporting frame being positionable over said opening in said base, said frame carrying a plurality of adjusting screws for adjusting the attitude of said frame with respect to said base, a telescope carrying a tubular collar and being supported for 360° rotation therein, portions of said telescope and collar being insertable through said openings in said frame and base, said telescope and collar being adjustably supportable on said frame by means of a flange extending from said collar, adapted to engage a portion of said frame said telescope carrying a plurality of level vials adapted for leveling by said adjusting screws for orienting said telescope in a precisely vertical position, said supporting frame being slidably movable with respect to said base for exactly aligning said telescope with the fixed reference point, and said supporting frame carrying a plurality of spaced clamps for clamping said tubular collar extending flange to said frame.

4. An optical plumbing apparatus for locating a point in vertical alignment above a fixed reference point, comprising a planar base with an opening therethrough, a circular supporting frame having an opening formed therein, said opening of said supporting frame being positionable over said opening in said base, said frame having a plurality of spaced adjusting screws for adjusting the attitude of said frame with respect to said base, a telescope carrying a tubular collar and being supported for 360° rotation therein, said collar having an extending circular flange, said telescope and collar being insertable through said openings in said frame and base, said telescope and collar being adjustably supportable on said frame by means of said extending flange, engaging a portion of said frame said telescope carrying a plurality of level vials adapted for leveling by said adjusting screws carried by said frame for orienting said telescope in a precisely vertical position, said supporting frame and adjusting screws being laterally movable in relation to said base for exactly aligning said telescope with the fixed reference point, and said supporting frame carrying spaced clamp means for clamping said tubular collar extending flange to said frame.

* * * * *